United States Patent
Schwan et al.

[19]

[11] Patent Number: 6,125,448
[45] Date of Patent: *Sep. 26, 2000

[54] POWER SUBSYSTEM FOR A COMMUNICATION NETWORK CONTAINING A POWER BUS

[75] Inventors: Martin A. K. Schwan, Chicago; John M. Sullivan, Lisle, both of Ill.

[73] Assignee: 3Com Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/850,089

[22] Filed: May 2, 1997

[51] Int. Cl.$^7$ ........................................... G06F 1/26

[52] U.S. Cl. .............................................. 713/300

[58] Field of Search .................... 395/750.01, 750.02, 395/750.08; 713/300–340; 709/200

[56] References Cited

U.S. PATENT DOCUMENTS

| | | | |
|---|---|---|---|
| 3,878,434 | 4/1975 | Voorhoeve | 317/16 |
| 4,607,330 | 8/1986 | McMurray et al. | 364/200 |
| 4,677,566 | 6/1987 | Whittaker et al. | |
| 4,780,714 | 10/1988 | Moustakas et al. | 340/825.5 |
| 5,214,311 | 5/1993 | Kageyama et al. | 307/18 |
| 5,272,382 | 12/1993 | Heald et al. | 307/66 |
| 5,305,174 | 4/1994 | Morita et al. | 361/63 |
| 5,381,554 | 1/1995 | Langer et al. | 395/750 |
| 5,428,524 | 6/1995 | Massie | 363/79 |
| 5,467,241 | 11/1995 | Sugitani et al. | 361/63 |
| 5,578,876 | 11/1996 | Crampton | 307/80 |
| 5,592,353 | 1/1997 | Shinohara et al. | 361/63 |
| 5,612,580 | 3/1997 | Janonis E Tal | 307/64 |
| 5,745,670 | 4/1998 | Linde | 395/182.2 |

OTHER PUBLICATIONS

Burke Henehan, Dan Yaklin, Bob Gugel, Jeff Akgul, "Galvanic Isolation of the IEEE 1394–1995 Serial Bus," *Texas Instruments Application Report Mixed Signal Products, SLLA011*, Oct. 1997.

"TSB21LV03A, IEEE 1394–1995 Triple–Cable Transceiver/Arbiter," *Texas Instruments SLLS278*, Nov. 1997.

"TSB12LV21A (PCILynx) IEEE 1394–1995 Bus to PCI Bus Interface," *Texas Instruments SLLS273*, Apr. 1997.

Ron Raybarman, Burke S. Henehan, 1394 Applications Group, "PHY Layout Application Report: SLLA020," *Texas Instruments Mixed Signal and Logic Products Bus Solutions*, Nov. 1997.

IEEE Standard for a High Performance Serial Bus, IEEE Std. 1394–1995, *IEEE* Aug. 30, 1996, Title Page, Table of Contents, Annex A and Chapter 4, pp. 49–112.

*Primary Examiner*—Ayaz R. Sheikh
*Assistant Examiner*—David A. Wiley
*Attorney, Agent, or Firm*—McDonnell Boehnen Hulbert & Berghoff

[57] ABSTRACT

A method and apparatus of powering components on a network by using a load-share technique and by using over-voltage and current-limiting circuitry. The power subsystem for a component in a network is designed in a load-share manner whereby the power subsystem will supply power to the network bus and to the component load. Under normal operation of the power subsystem, the load will be powered directly from the power subsystem. In the event of a failure, the load will immediately pull power from the bus and thereby maintain network operation. The power subsystem and the power supply are protected from disruptions due to voltage or current surges. Further, the power subsystem is in compliance with the IEEE 1394 specifications in terms of recommended current levels and galvanic isolation of the power sources.

11 Claims, 14 Drawing Sheets

POWER SUBSYSTEM FOR A COMMUNICATION NETWORK CONTAINING A POWER BUS

BACKGROUND OF THE INVENTION

A. Field of the Invention

This invention relates to the operation of a data network which interconnects different application modules, and more particularly relates to a method and apparatus for powering components on a data network.

B. Description of Related Art

Networks are the means through which commercially-available components or modules, such as computers, may communicate. One of the problems in formulating a network is the means through which power is supplied to the components in the network. The means for power must be reliable to guarantee network operation, accounting for disruptions to the power supply both at a component level and at a network level. When disruptions do occur, the goal is to maintain network operation and prevent loss of data. The means for power must also must comply with the standards of the particular network.

One such standard for a network is the IEEE 1394-1995 protocol (IEEE 1394) which is discussed in an article entitled "IEEE Standard for a High Performance Serial Bus" published by the IEEE. The IEEE 1394 is also referred to in the industry as Firewire™. However, there are several problems when integrating the IEEE 1394 standard in the design of a multiple-module network. For example, the IEEE 1394 standard requires that the physical interface devices which interconnect with the IEEE 1394 bus powered by a galvanically-isolated supply voltage. With only one module supplying network power, and a large number of modules consuming network power, the 1.5 Ampere current sourcing limit imposed by the IEEE 1394 standard (based upon the connector design) is inadequate to supply power to all of the modules.

If one attempts to address the problem by requiring each module to supply its own power only, one looses the ability of the entire network to stay alive in the event of a power failure of a single module, if that module is being used as a network repeater. Further, if the modules are designed as power sources and power loads simultaneously, and the full IEEE 1394 voltage range of 8–40 Volts for power sources is used, it is difficult to determine which module will supply power to another module in the event of the power failure of one or more modules, and hence cannot guarantee reliable network operation. The present invention solves these and other difficulties.

SUMMARY OF THE INVENTION

In accordance with a first aspect of the invention, a power system for a data processing system is provided. The data processing system has a network bus connected to a component wherein the network bus contains a network power line. The power system has a power supply unit connected to the network power line and to the load. The power system also has circuitry connecting the network power bus to the load. The power system further includes a power selection circuit connected between the power supply unit and the network power line for selecting the power supply unit to power the load. Finally, the power system includes a current limiting circuit which protects the power supply unit from excessive current on the network power line.

In accordance with a second aspect of the invention, a power system for a data processing system is provided. The data processing system has a network bus connected to a component wherein the network bus contains a network power line. The power system has a power supply unit connected to the network power line and to the load. The power system also has circuitry connecting the network power bus to the load. The power system further includes a power selection circuit connected between the power supply unit and the network power line for selecting the power supply unit to power the load. Finally, the power system includes an over-voltage circuit for shielding the load from voltage on the network power line which exceeds a predetermined voltage.

In accordance with a third aspect of the invention, a method of powering a component within a data processing system is provided. The component has a power supply and a load and the data processing system has a network bus containing a network power line. The method includes the step of powering the network power line with power from the power supply unit. The method also includes the step of selecting the power supply unit, rather than the network power line, to power the load. In addition, the current is steered from the power supply unit to the load and from the network power line to the load. The method further includes the step of removing the power supplied by power supply unit to the load. The method also includes powering the load by the network power line after the power supplied by the power supply unit to the load is removed.

In accordance with a fourth aspect of the invention, a method of powering a component within a data processing system is provided. The component has a power supply and a load and the data processing system has a network bus containing a network power line. The method includes the step of supplying the power to the network power line by the power supply unit. In addition, the load is powered. The method also includes the step of protecting the load from the network power line in the event of an increase in the network power line voltage greater than a predetermined limit. Further, the method includes the step of protecting the power supply unit from the network power line in the event of a short circuit in the network power line.

Accordingly, a primary object of the invention is to provide a power system which supports an arbitrarily large network.

Another object of the invention is to maintain normal network operation in the event of a local power outage affecting a large number of components.

Another object of the invention is to maintain normal network operation in the event of a short-circuit or open-circuit fault in the network cable's power wires.

A further object of the invention is to configure a component on the network as a power load and, if desired, a power source simultaneously.

Yet a further object of the invention is for a component preferentially to supply power to its own circuitry.

Still another object of the invention is to protect the power supply of each component from current being driven into the power supply.

Still another object of the invention is for each component to be protected against network over-voltage.

Yet another object of the invention is for each component to be protected against a short-circuit.

Still yet another object of the invention is the maintenance of galvanic isolation in accordance with the IEEE 1394 standard.

These and other objects, features, and advantages of the present invention are discussed or apparent in the following detailed description.

BRIEF DESCRIPTION OF THE DRAWINGS

A presently preferred embodiment of the present invention is described herein with reference to the drawings wherein.

DETAILED DESCRIPTION OF THE PREFERRED AND ALTERNATIVE EMBODIMENTS OF THE INVENTION

Figure 1:
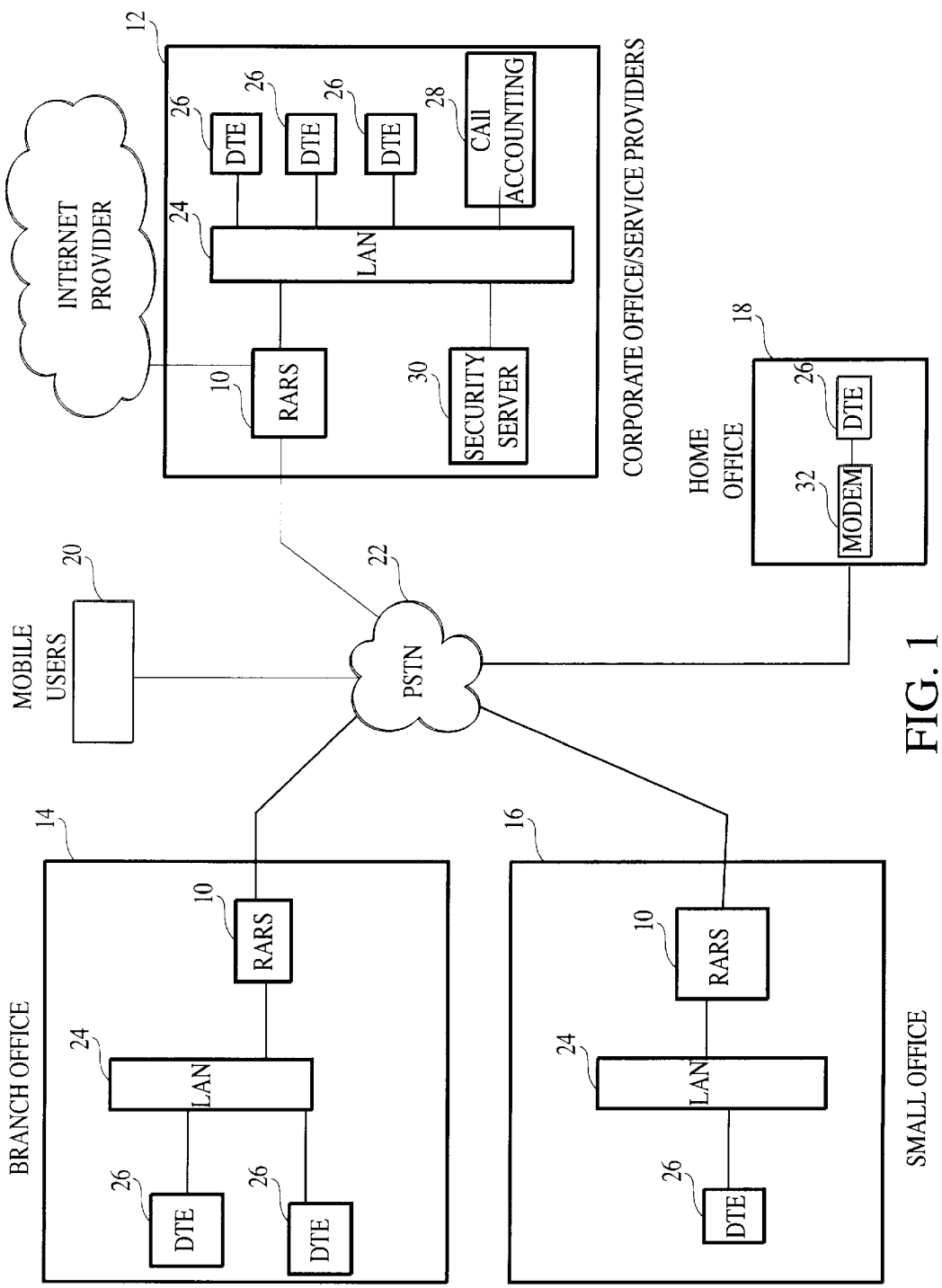
FIG. 1 is an application of the Remote Access and Routing Server.

FIG. 1 refers to a Remote Access and Routing Server (RARS) 10 for a data processing system. The Remote Access and Routing Server 10 integrates separate data communication entities via a public switched telephone network (PSTN) 22. The Remote Access and Routing Server 10 provides remote access for mobile users and for individuals at home offices, access nodes for Internet service providers, and dial-up local area network to local area network (LAN-to-LAN) routing capabilities for geographically disperse corporate enterprises. For example, FIG. 1 discloses one application of the Remote Access and Routing Server 10 which allows communication between corporate offices (central and branch offices) 12, 14, 16, homes and mobile users 18, 20. In a Corporate Office or Internet Service Provider 12, the Remote Access and Routing Server 10 is connected to a LAN 24 which is in turn connected to Data Terminating Equipment (DTE) 26, such as a computer, and to other devices 28, 30. The Internet Service Provider 12 is also connected to the Internet. Branch Offices 14 or Small Offices 16 may also be connected to the PSTN 22 via the Remote Access Routing Server 10. Further, Mobile users 20 and Home Office users 18 may connect to the PSTN 22 via a modem 32 or other data communication device.

Figure 2:
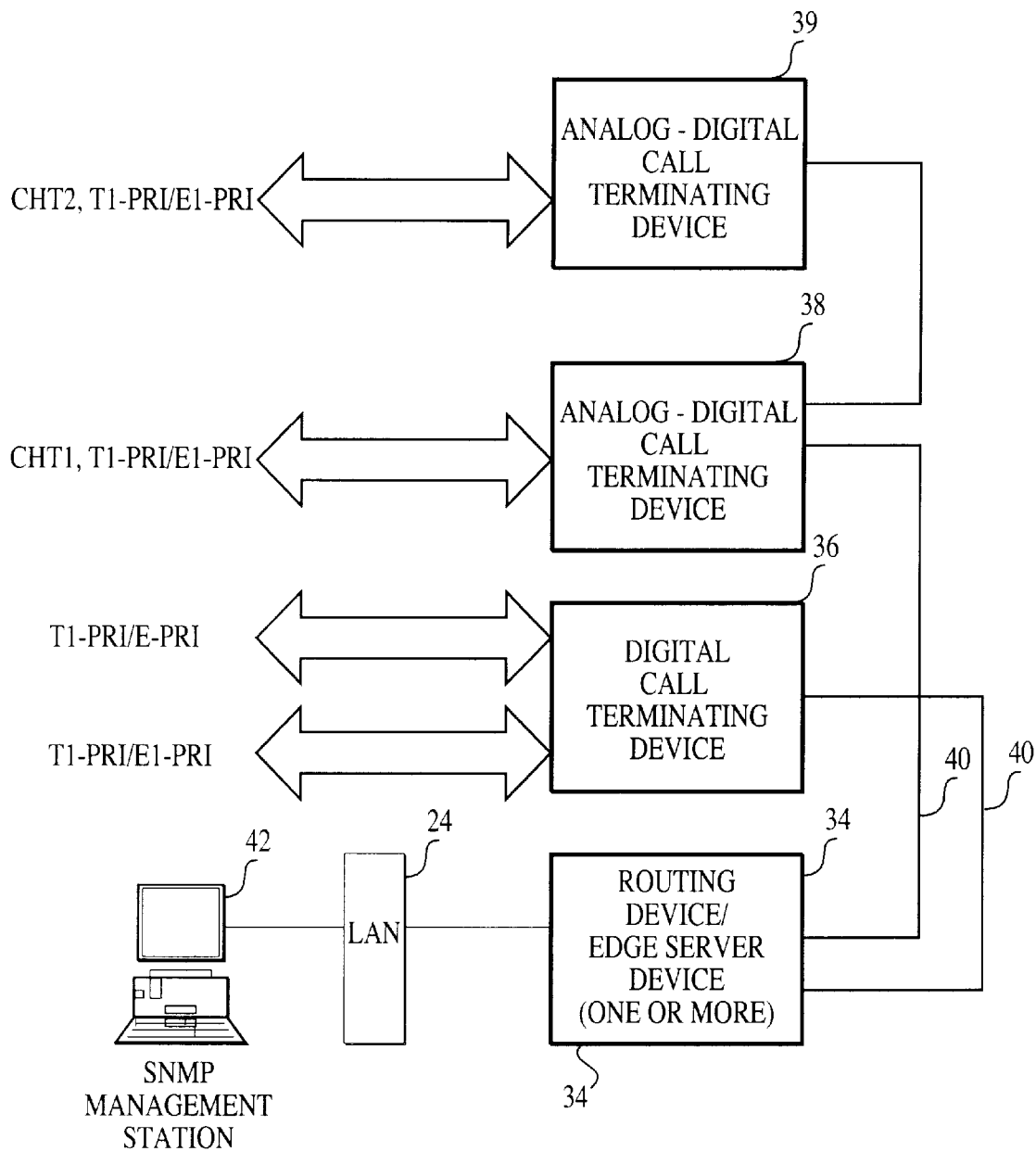
FIG. 2 is a block diagram of the network and the devices comprising Remote Access and Routing Server.

The Remote Access and Routing Server 10 is comprised of a stackable architecture whereby various suboperations of the Remote Access and Routing Server 10 are separated at the device level into a Routing Device 34, a Digital Call Terminating Device 36, and Analog-Digital Call Terminating Device 38, allowing for expandability of the system based on a user's needs. The user may expand the system by simply adding slices to the stack in modular increments. In this manner, the user's system may grow to match the user's needs. The Remote Access and Routing Server 10 may also be combined into one system without separation at the device level. Referring to FIG. 2, the modules are connected via a network 40 with each device having its own power supply. The network allows inter-device communication in the system architecture. The Routing Device 34, also known as a Router, the Digital Call Terminating Device 36 and the Analog-Digital Call Terminating Device 38 are interconnected by the network 40, which is based upon the IEEE 1394 (Firewire). The Routing Device 34 is connected to a local area network (LAN) 24 which is in turn connected to a management station 42. Each device is connected to the network 40 via a node which has an address. A single device may have multiple nodes connected to the network 40. Further, each node attached to the network 40 has equal access to the data transfer services and share the available bandwidth with other nodes. Each of the components have connectors to the network 40 and can support a nominal 200 mb/s data rate. This application incorporates by reference U.S. Pat. No. 5,528,595 by inventors Walsh et al. entitled Modem Input/Output Signal Processing Techniques, which describes further aspects of the Analog-Digital Call Terminating Device and the Routing Device.

Figure 3:
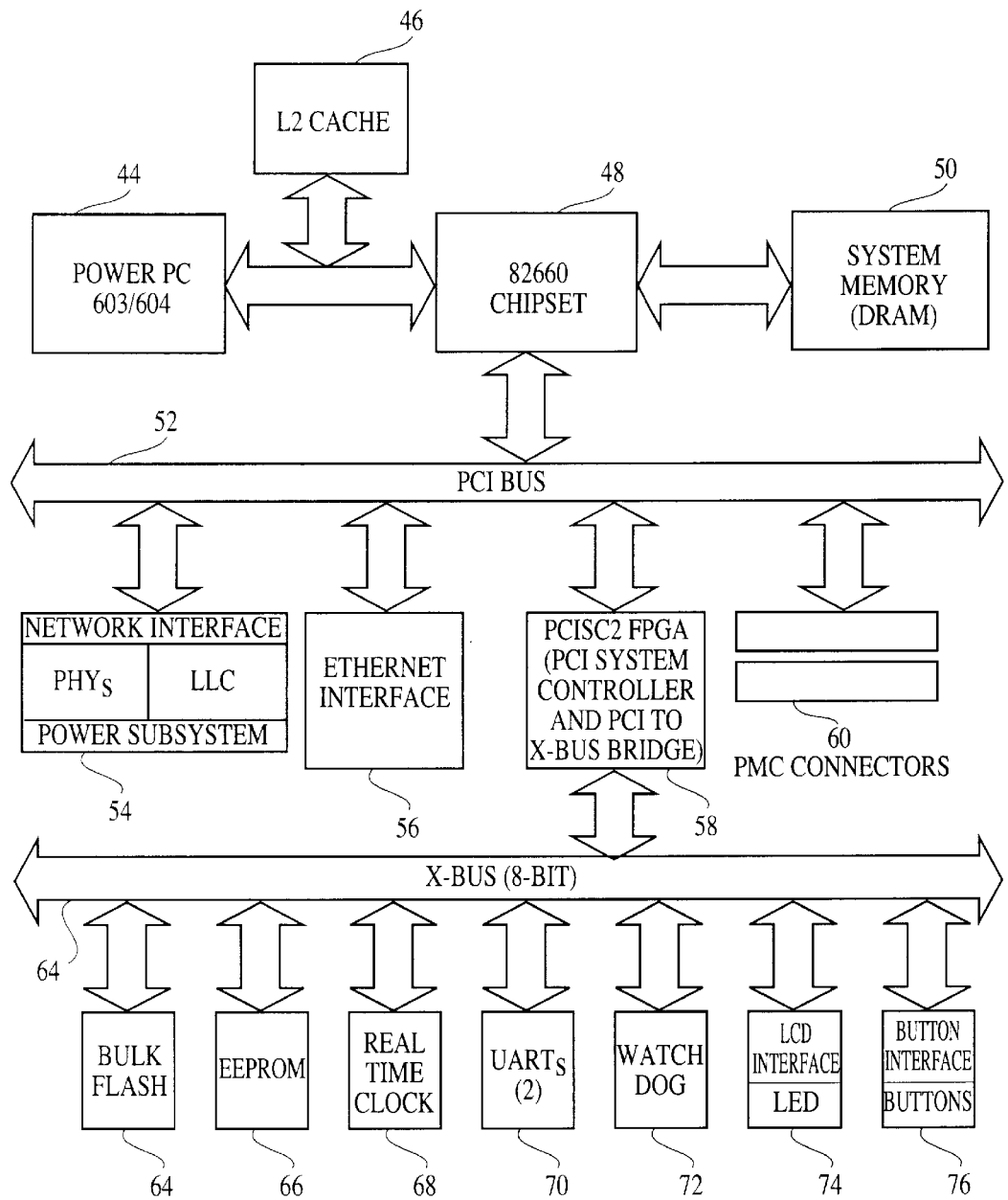
FIG. 3 is a block diagram of the Routing Device.

The Routing Device 34 contains the router engine, the 10/100 Mbit Ethernet® interface 56 and a network interface 54, referring to FIG. 3. The Routing Device 34 is the center of system management. It provides the functionality to route all of the protocols supported by the Remote Access and Routing Server 10, is the simple network management protocol (SNMP) agent for management of the system, and allows for synchronous serial interfaces for connection to a LAN or a Wide Area Network (WAN).

An Edge Server Device is a device which is placed at the edge of the Local Area Network. The Edge Server Device is similar to the Routing Module in that it implements the network management components required as the primary network manager module on the network. The Remote Access and Routing Server 10 may be implemented using a Routing Device 34, an Edge Server Device or a combination of both devices.

The Digital Call Terminating Device 36 contains two T1/E1 Primary Rate Interface (PRI) connections, a network interface and the necessary hardware to terminate two spans worth of Integrated Services Digital Network (ISDN) originated calls. Depending on the country, either T1 or E1 is used. T1 is a standard for digital transmission in the United States, Canada, Hong Kong and Japan with a capacity of 1.544 M bits per second. E1 is a standard for digital transmission in Europe with a capacity of 2.048 M bits per second. Call traffic, following processing by the Digital Call Terminating Device 36, is passed to the Routing Device 34, which in turn communicates with a LAN 24.

The Analog-Digital Call Terminating Device 38 is a single-span T1/E1 access module designed to terminate calls of both analog and digital origin. This call traffic, following processing by the Analog-Digital Call Terminating Device 38, is passed to the Routing Device 34, which in turn communicates with a LAN 24. As shown in FIG. 2, a second Analog-Digital Call Terminating Device 39 can be integrated into the network 40. Therefore, the Analog-Digital Call Terminating Devices can be place in a star or daisy-chain topology with a second Analog-Digital Call Terminating Device acting as a repeater.

Referring to FIG. 3, a block diagram of the Routing Device 34 is shown. The central processing unit for the Routing Device 34 is a PowerPC™ 603 44 manufactured by IBM and Motorola and operating at 200 MHz. Because the printed circuit board will use a BGA package for the PowerPC™, and will contain a 2.5 Volt regulator, the printed circuit board can accommodate any PowerPC™ 603 or 604 device for adjustments as central processing unit capacity requirements change. The CPU chipset 48 is the IBM 82660 family consisting of the 82663 buffer and 82664 controller. This chipset 48 provides a glueless interface between the PowerPC™ 44, system memory (DRAM) 50, L2 cache 46, and the on-board PCI bus 52.

The L2 cache 46 consists of a single 16Kx15 cache tag RAM with 4 32Kx32 SSRAM devices to support the 512 KB of L2 cache. Further information on the IBM 82660 chipset 48 is in IBM27-82660 PowerPC™ to PCI Bridge and Memory Controller User's Manual, IBM, SC09-3026-00, 1996.

Main memory is 64 bits in width and consists of 16 MB of base memory plus field upgrade capacity to 144 MB. Base memory consists of eight 1 Mx 16 60 ns EDO DRAM devices soldered to the PCB for reliability and low cost. The PCB contains one 168-pin DIMM socket for memory expansion to 24, 32, 48, 80, or 144 MB total capacity using a 8, 16, 32, 64, or 128 MB DIMM respectively. Expansion memory is EDO for higher performance. Boot memory contains the CPU's primary bootstrap code to be executed upon hardware reset and consists of a software-locked segment of main storage flash. This allows primary bootstrap code to be field-updated in the unlikely event that becomes necessary. Storage memory (Bulk Flash 64) is erasable and supports the operational code and the application's file system. It consists of 4 MB of flash memory, with provision for larger factory-installed sizes. The printed circuit board supports four flash devices so that the board is populated with two 2 MB x 8 devices for a total of 4 MB. The maximum configuration is 8 MB with 2 MB x 8 devices. Memory is accessible as 32 64 KB blocks per device with boot memory and storage memory share the same physical device.

Storage memory consists of two Intel 28F016SC devices or two AMD 29F016 devices, with separate programming algorithms for the Intel or AMD devices. A command user interface serves as an interface between the CPU and the internal operation of the device. A valid command sequence written to the device initiates automatic execution of algorithms and timings for block erase, byte write, and lock-bit configuration operations. A block erase operation erases one of the 64 KB blocks typically within one second wherein each block may be erased 100,000 times.

The Non-Volatile Memory is an EEPROM 66 consisting of 512 bytes. The EEPROM 66 is written with the serial number and configuration data as part of the manufacturing process. Non-volatile memory consist of one NM93LC66 device with locations individually addressable (as 16-bit "registers"). The non-volatile device is accessed serially via a three-wire interface (select, clock, data); however, this serial access is under control of the PCISC2 FPGA, which makes the EEPROM 66 visible to software through a conventional register set.

Two UARTs (Universal Asynchronous Receiver Transmitter) 70 are supported in the Routing Device, as shown in FIG. 3. The first is a Console Port UART and is customer-accessible via a front-panel DB9 connector. The UART complies with the ANSI RS-232-E and ITU V.28 standards, is configured as a DTE interface, supports hardware RTS-CTS flow control, contains 16-byte transmit and receive FIFOs, and supports the required asynchronous communication rates of 9600, 19200, 38400, 57600, and 115200 Baud. The Console Port UART consists of one 16C550CFN device clocked at 3.6864 MHz and one Maxim MAX241 transceiver.

The second UART is a Debug UART. The debug port is terminated internal to the Routing Device via a header, is compliant with ANSI RS-232-E and ITU V.28 standards, is configured as a DTE interface, supports hardware RTS-CTS flow control, contains 16-byte transmit and receive FIFO's, and supports the required asynchronous communication rates of 9600, 19200, 38400, 57600, and 115200 Baud. The debug port consists of one 16C550CFN device clocked at 3.6865 MHz, and one Maxim MAX241 transceiver.

The Real-Time Clock 68 is used to provide date (year, month, day of month, day of week) and time (hours, minutes, seconds, hundredths). In addition to time/date availability, the device features alarm time comparison, programmable clock tick interrupt generation, a small number of bits of general purpose non-volatile RAM, and automatic storage of the date/time of last power failure. The Real-Time Clock 68 consists of a DP8573A device with a dedicated 32.768 kHz crystal and capacitor backup power.

The Watchdog Timer 72 detects unusual operation by interrupting and then resetting the module if the timer 72 has been enabled but not been tickled in nominally 1.6 seconds. Upon reset, the watchdog timer is disabled, and requires an explicit software operation to enable it. Once enabled, software cannot disable it without allowing it to expire. Expiration of the watchdog causes a non-maskable interrupt (NMI) to occur. The Watchdog Timer 72 consist of one Maxim MAX697 supervisor device with assistance from the PCISC2 FPGA.

Voltage tolerance monitoring is provided on two critical voltages (+5.0 Volts, +3.3 Volts). Monitoring of +5.0 Volts is provided by the power supply unit. Monitoring of the Power supply unit generated +5.0 and +3.3 Volts is performed by on-board Routing Device circuitry, as discussed subsequently. If any voltage becomes out-of-tolerance, the board will be placed in a reset condition and held until the out-of-tolerance condition passes. The +5.0 and +3.3 voltages are monitored on-board so as to generate a proper power-up reset signal to the board. The +2.5 Volt signal, generated on-board, is not monitored, because it is derived from a high-MTBF regulator, and because a reset signal is more accurately derived by monitoring that regulator's input voltage (+5.0/+3.3). On-board voltage monitoring will be performed by the voltage detection subsystem of the Maxim MAX 697 supervisor device.

The Routing Device 34 is equipped with a reset button 76 which causes an immediate hardware reset of the entire module. This is required for debugging and catastrophic error recovery under otherwise unanticipated conditions. The button 76 drives the Maxim MAX 697 supervisor device, which is responsible for reset generation and timing.

A digital thermometer-thermostat device is used to sense on-board temperature. The device's alarm setpoint is programmed at time of board manufacture so that an alarm is generated and routed to a status register when this setpoint is exceeded. This setpoint is the "hard" setpoint beyond which proper operation cannot be guaranteed. The temperature sensor device is accessed serially via a three-wire interface (select, clock, data); however, this serial access is under control of the PCISC2 FPGA 58, which makes the device visible to software through a conventional register set. In addition to this means of measuring on-board temperature, the power supply unit will be capable of detecting an over-temperature condition within the power supply unit itself.

The basic user interface consists of an LCD (liquid crystal display) panel 74, six buttons 76, and two LEDs (unit power and unit status) 74. The LCD 74 and buttons 76 reside on a subassembly which attaches to the main PCB via a cable and connector. The LCD 74 and button peripherals 76 are connected to the PCISC2 FPGA 58.

The PCI Bus 52 is provided by the IBM82660 chipset 48. It operates at 3.3 Volts and is compliant with PCI Specification Revision 2.0. The PCI Bus 52, like the rest of the Routing Device 34, is operated in big endian (also known as non-Intel) byte-order mode. Big endian is a format for storage or transmission of binary data in which the most significant byte comes first. The reverse convention is called little endian. PCI device configuration registers are required to operate in little endian mode for PCI compliance; therefore, software reorders bytes only when reading PCI device configuration registers. Two single-width PMC Connector slots 60 are provided for future expansion.

PCI based systems require a set of bus support functions (referred to as Central Resource Functions) that are usually not provided by a PCI Bridge such as the IBM82660 48. The Central Resource Functions in this design include a central arbiter, interrupt controller, and miscellaneous logic for individual device selection during PCI configuration cycles. These functions are provided in the PCISC2 FPGA device 58. In addition to the Central Resource Functions, this device 58 provides a bridge to a slower-speed eight-bit bus (X-bus) 62 which supports all non-PCI peripherals (flash memory 64, UARTs 70 etc.). The PCISC2 FPGA 58 provides bus buffering and control, address decoding, and chip select generation for X-Bus peripherals. The Ethernet® Interface 56 connects to the Ethernet® LAN subsystem. The Network Interface 54 connects to the IEEE 1394. The Network Interface 54 contains the physical layer interfaces (PHYs), link layer controller (LLC), and the power subsystem, as shown in FIGS. 5, 6A, 6B, 7A, 7B, 8, and 9, which are described subsequently. The Network Interface 54 also programmed to communicate with the PowerPC™ 44 whereby the Network Interface 54 indicates to the PowerPC™ 44 when a packet has been received or sent. Software code, which is resident in System Memory 50, is executed by the PowerPC™ 44 to control the operation of the Network Interface 54.

The Edge Server Device is designed based on industry standard personal computer architecture using commercially available components. Intel® Pentium Pro® processor-based mother boards are used. Further the operating system is Windows NT™ 4.0. Therefore the Edge Server device uses the native remote access service for Windows NT™ to provide the functionality of a dialup router. The Edgeserver Module originates and terminates calls from the Analog-Digital Call Terminating Device 38 and the Digital Call Terminating Device 36. Therefore, the Edgeserver Module is able to answer and authenticate inbound calls and route them onto a corporate LAN using the IP protocol. The power subsystem, as shown in block 54 of FIG. 3 and FIGS. 5, 6A, 6B, 7A, 7B, 8, and 9, is integrated into the Edge Server device in order to power the PHYs and also power the network power bus, as discussed subsequently.

Figure 4A:
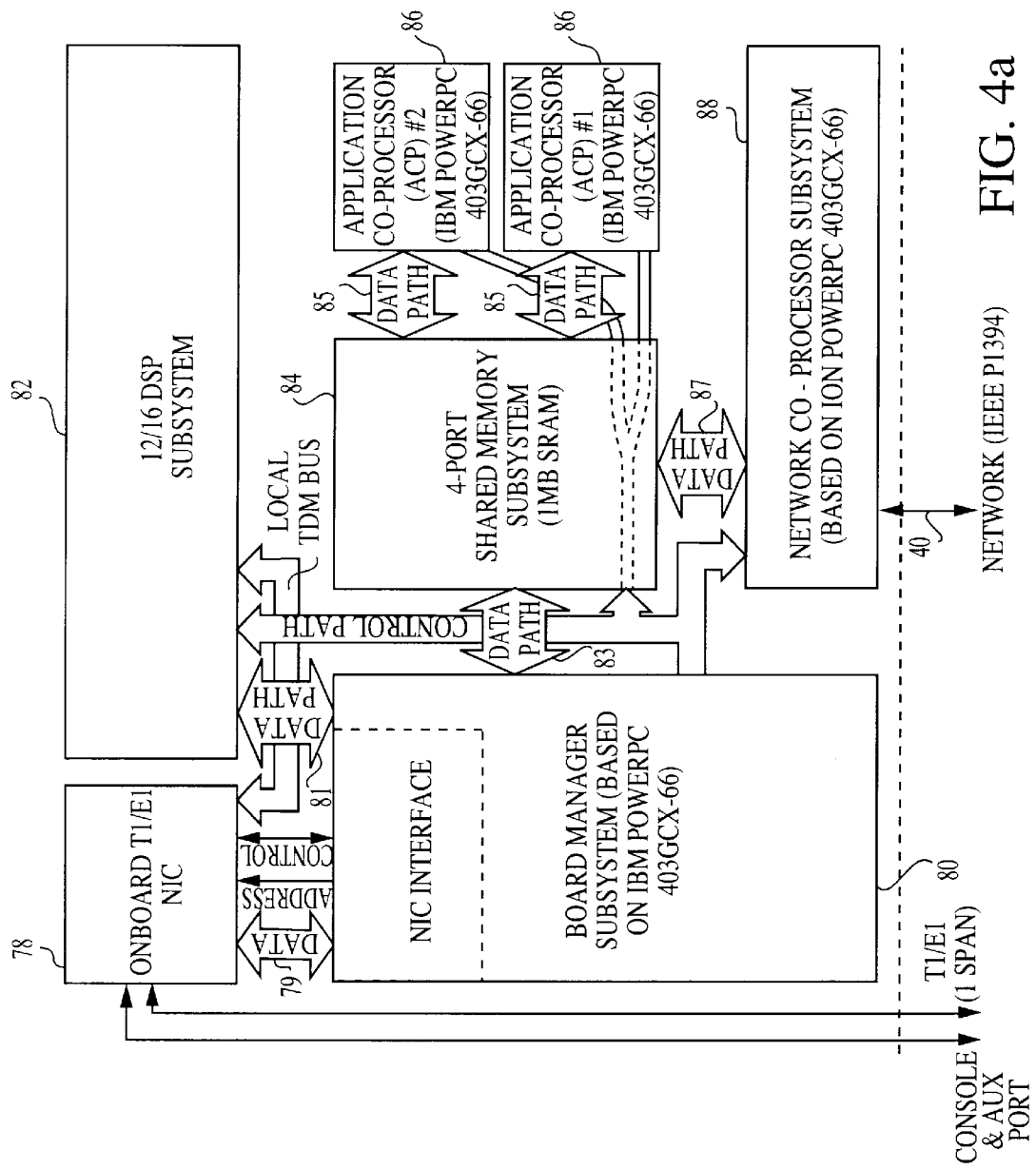
FIG. 4A is a block diagram of the Analog-Digital Call Terminating Device.

Referring to FIG. 4A, a block diagram of the Analog-Digital Call Terminating Device 38 is shown. The Onboard T1/E1 NIC (Network Interface Card) 78 provides an interface between the T1/E1 telephone lines and the remainder of the Analog-Digital Call Terminating Device 38. The Board Manager Subsystem 80 executes the software which controls the calls to and from the T1/E1 line. The Board Manager Subsystem 80, when receiving data from the T1/E1 line, sends the data to the DSP Subsystem 82 which contains 24 modems. The DSP Subsystem 82 may be expanded to include 30 modems. Subsequently, the Board Manager Subsystem 80 sends the data to the 4-Port Shared Memory Subsystem 84. The Network Co-Processor Subsystem 88 then takes the data in the Shared Memory Subsystem 84 and sends it onto the Network 40 for routing by the Routing Device 34. When sending data onto the T1/E1 line, the process is reversed in that the data is taken from the Shared Memory Subsystem 84, sent to the DSP Subsystem 82, through the Onboard T1/E1 NIC 78, and then to the T1/E1 line.

The various subcomponents of the Analog-Digital Call Terminating Device 38 communicate with each other via data buses, as shown in FIG. 4A. Further, there is a local time division multiplex line connecting the DSP Subsystem 82 with the Onboard T1/E1 NIC 78, as discussed in further detail subsequently.

Figure 4B:
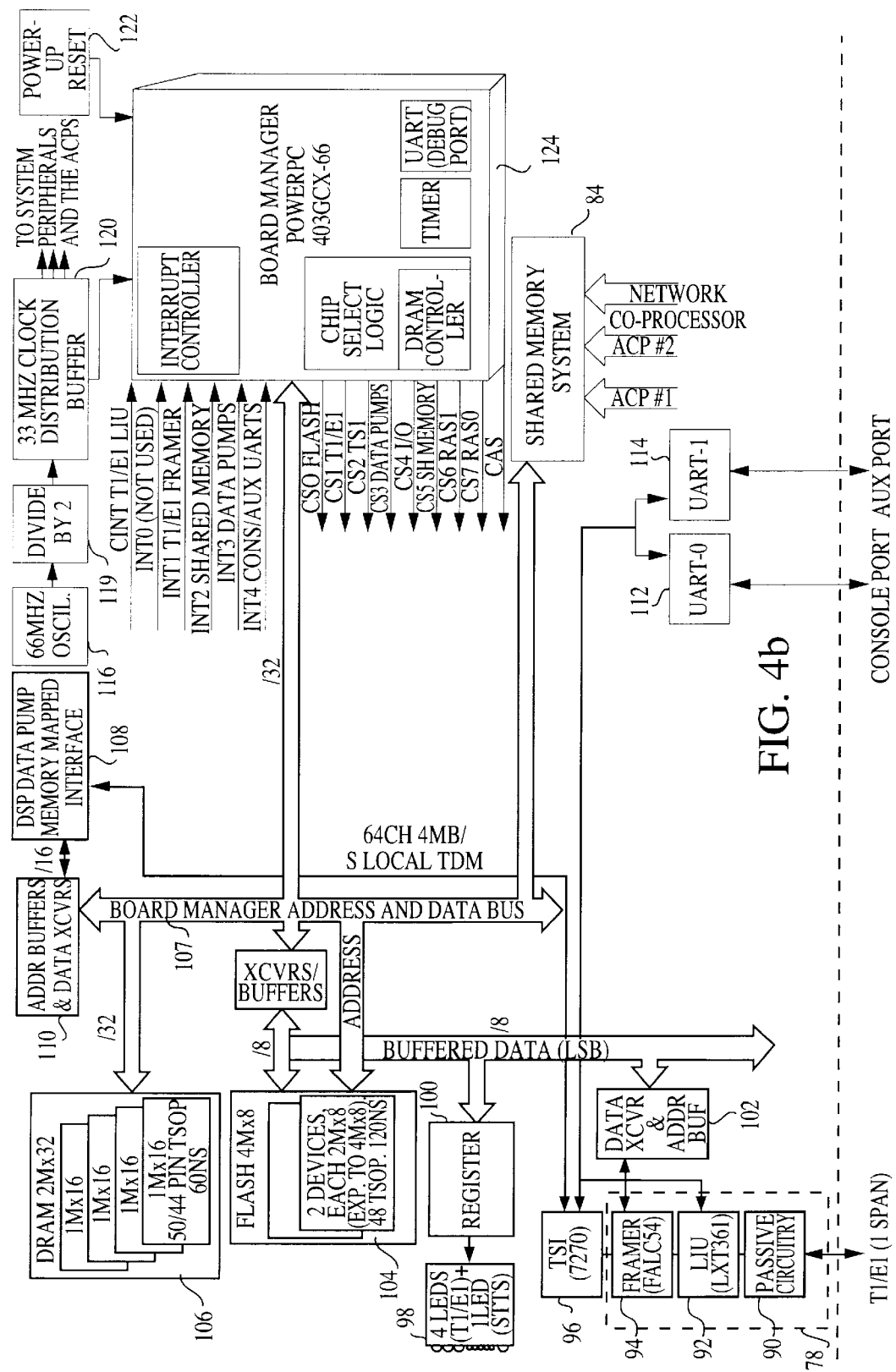
FIG. 4B is a block diagram of the Onboard T1/E1 NIC (Network Interface Card), Board Manager Subsystem, DSP (Digital Signal Processing) Subsystem and Shared Memory Subsystem of the Analog-Digital Call Terminating Device.

FIG. 4B shows a more detailed block diagram of the Onboard T1/E1 NIC 78, Board Manager Subsystem 80, Shared Memory Subsystem 84 and DSP Subsystem 82 of the Analog-Digital Call Terminating Device 38. The passive circuitry 90 contains transformers and protection devices to protect from any spikes in the voltage on the T1/E1 line. The passive circuitry 90 also matches the impedance to the T1/E1 line. The Line Interface Unit (LIU) 92, part number LXT361, is the physical layer interface, acting as a line driver/receiver. The Framer 94 handles all of the T1/E1 framing and transmit framing tasks. The Time-Slot Interchanger (TSI) 96 allows the time slots to be remapped when sent back onto the T1/E1 line. The 64 channel Local Time Division Multiplex (TDM) bus is connected between the Time-Slot Interchanger 96 and the DSP 108. The Board Manager PowerPC™ model number 403GCX-66 also communicates with memory devices, FLASH 104 and DRAM 106. The Board Manager Address and Data Bus 107 connects the Board Manager 124 with the DSP Subsystem 82, the Shared Memory System 84 and the Onboard T1/E1 (NIC) 78, as indicated by the data paths in FIG. 4A (81, 83, 79).

Figure 4C:
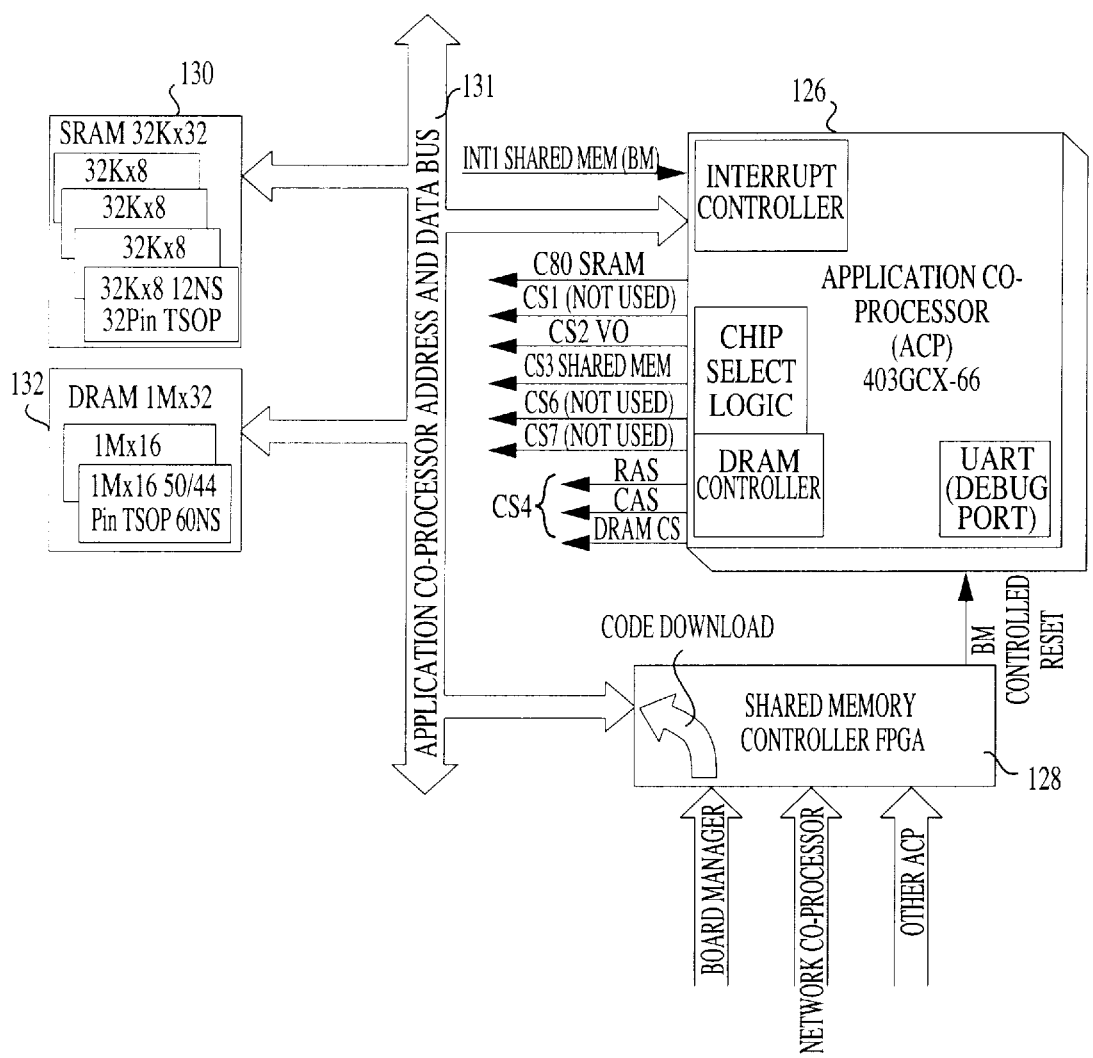
FIG. 4C is a block diagram of the Application Co-Processor and Shared Memory Controller of the Analog-Digital Call Terminating Device.

FIG. 4C shows a more detailed block diagram of the Application Co-Processor 126, PowerPC™ model number 403GCX-66, in combination with the Shared Memory Controller 128 and SRAM 130 and DRAM 132 memory devices. The Application Co-Processor Address and Data Bus 131 connects the Application Co-Processor 126 with the Shared Memory Controller 128, the SRAM 130 and DRAM 132, as indicated by the data path in FIG. 4A (85).

Figure 4D:
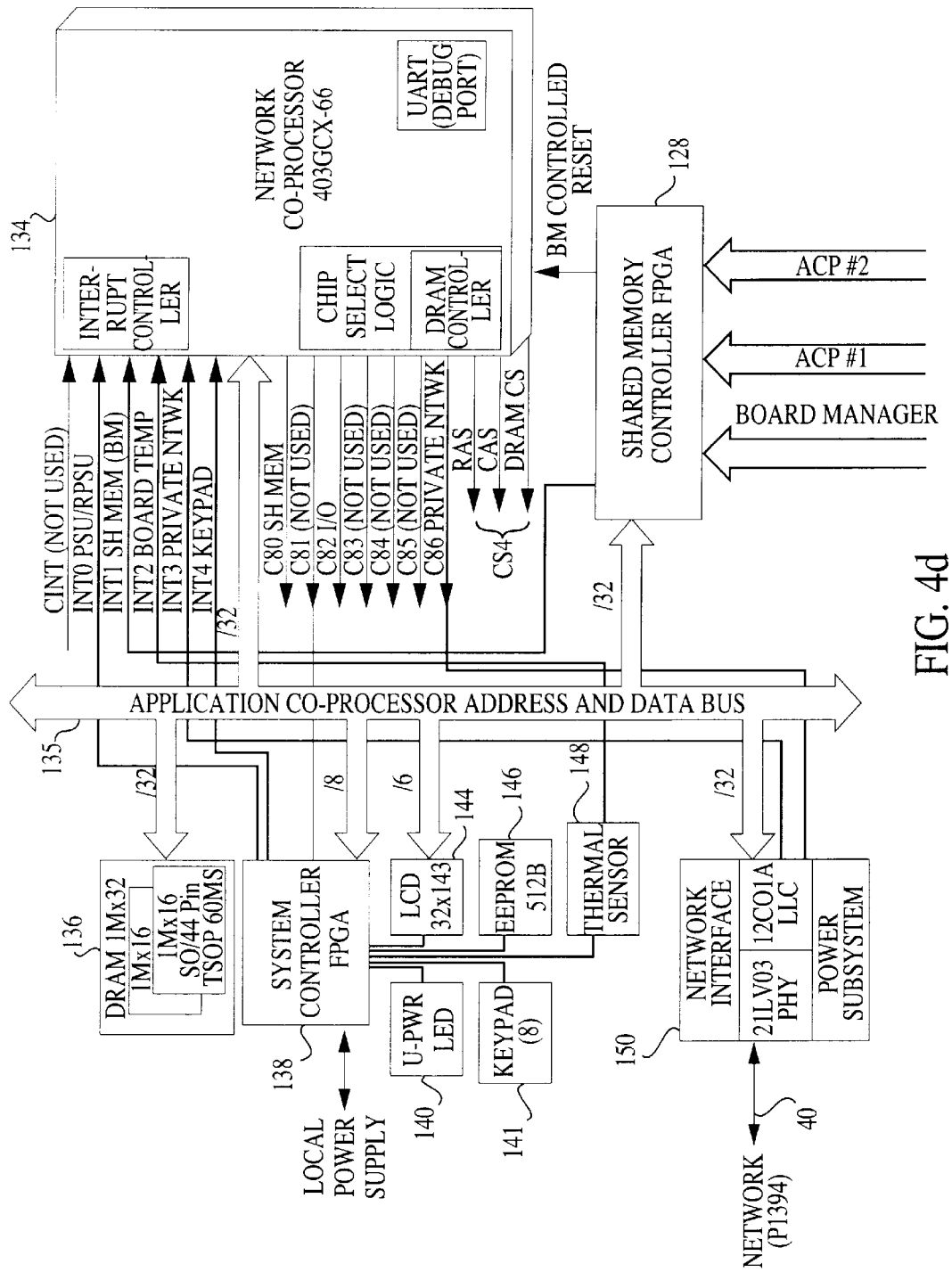
FIG. 4D is a block diagram of the Network Co-Processor Subsystem and Shared Memory Controller of the Analog-Digital Call Terminating Device.

FIG. 4D shows a block diagram of the Network Co-Processor 134, PowerPC™ model number 403GCX-66. The Network Co-Processor 134 is the interface for the Analog-Digital Call Terminating Device 38 to the IEEE 1394. The System Controller FPGA 138 is for monitoring the primary power supply and the backup power supply, allowing the Network Co-Processor 134 to control the local power supply. The Network Interface 150, similar to the Network Interface 54 for the Routing Device 34, connects to the IEEE 1394. The Network Interface 150 contains the physical layer interfaces (PHYs), link layer controller (LLC), and the power subsystem, as shown in FIGS. 5, 6A, 6B, 7A, 7B, 8, and 9, which are described subsequently. The Network Interface 150 is also programmed to communicate with the Network Co-Processor 134 whereby the Network Interface 150 indicates to the Network Co-Processor 134 when a packet has been received or sent. Software code, which is resident in DRAM (Dynamic Random Access Memory) 136, is executed by the Network Co-Processor 134 to control the operation of the Network Interface 150. The Network Co-Processor Address and Data Bus 135 connects the Network Co-Processor 134 with the Shared Memory Controller 128, as indicated by the data path in FIG. 4A (87).

Figure 5:
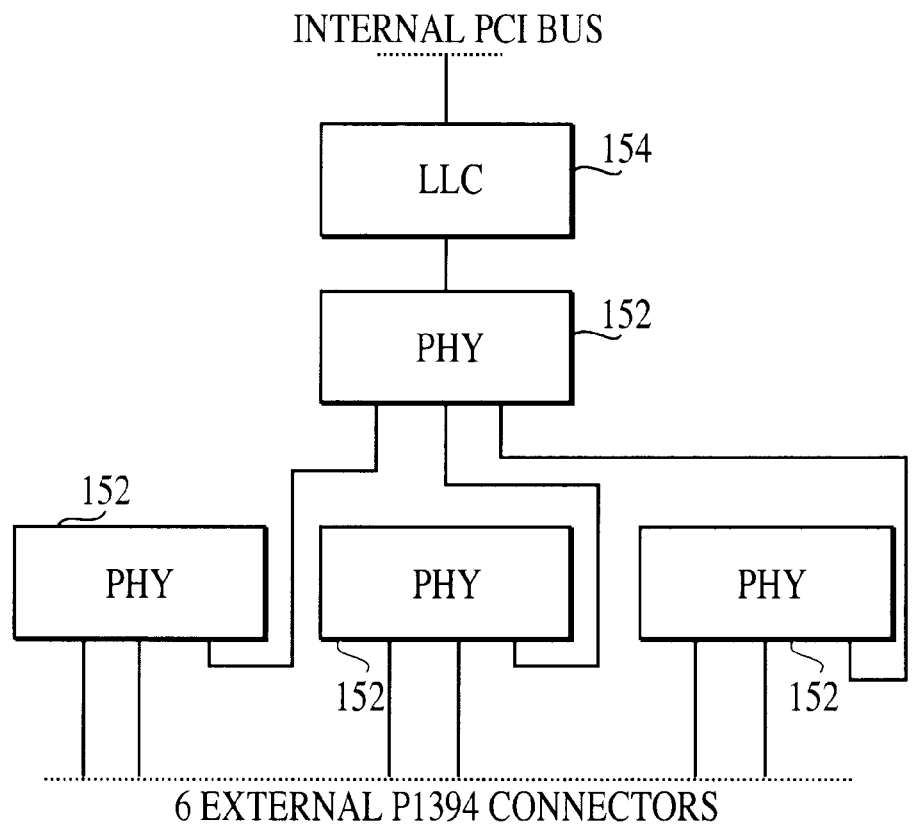
FIG. 5 is a block diagram of the interconnections between the physical layer and the link layer.

As shown in FIG. 5, the Routing Device 34 provides six connectors to the network in an arrangement. The network connectors are designed using a chipset from Texas Instruments whereby four chips, model number TSB21LV03 are used for the cable transceiver and physical layer interface (PHY) 152 to support six ports. A Texas Instruments chip, model number TSB12LV21 (also known as PCI-Lynx) is used for the link layer controller (LLC) 154 and the PCI bus interface. The four physical layer interfaces 152 are connected to support the six network ports. Each of the lower three physical layer interfaces 152 supports two connectors; the third port of these physical layer interfaces 152 is connected to the three ports of the fourth physical layer interface 152. Thus, the configuration in FIG. 5 illustrates the interconnection of four physical layer interfaces 152 and the PCI-Lynx link layer controller 154 to create six external network ports. The use of six network connectors allows a star topology so that another failing component may be removed without impact on operating components. Other components may provide three network connections, rather than six, so that a bus topology, or a bus-star hybrid topology may be used as desired.

The network physical medium 40 is a three pair 110-ohm shielded cable with one differential transmit pair, one differential receive pair and one power pair, housing the network power bus. A minimum of external components is required between the IEEE 1394 cable connectors and the physical layer interface, mainly to support termination.

The IEEE 1394 standards and network integrity requirements place several restrictions on the design of a network power bus 156. The IEEE 1394 standard limits the current on the bus to a maximum of 1.5 Amp. Therefore, one component with a power source cannot supply network power to a network with several modules since the 1.5 Amp limit will quickly be reached. A design which simply requires each component on the network to supply its own power solves the current limit requirement, but makes the entire network more susceptible to power failure. If a component which acts as a network repeater experiences a power failure, this failure interrupts network function and may bring the entire network down.

In order to comply with the IEEE 1394 requirements and maintain a stable network power system, several techniques are used to maintain power integrity in the face of a power failure either at the component level or at the network level. First, the power network is designed in a load-share technique so that, if a component suffers a power failure, the component will still be able to operate and maintain a limited repeater operation as currently implemented. In data networks with higher current limits than the 1.5 Amp on the bus power lines (as specified by the IEEE 1394 specification), full normal operation can be maintained on the entire module, including operation of the load and the other module components, via the network power bus in the event of a power failure on the module.

Components on the network are designed so that some components may act only as loads and other components may act as both sources and loads in the event of a power failure. This is accomplished by the components simultaneously supplying power to its load and to the bus. In the event of a power outage by a single component on the network, the load which is powered by the component may draw power from the network power bus instead. In this manner, network operation may continue uninterrupted due to a failure in any single component power supply or due to a failure in several component power supplies. Thus, this design may be applied to any network in which it is desirable to load-share power for the purpose of fault-tolerance and network reliability. Further, this design may be used to power any bus structure where power is available on the bus.

Second, each component preferentially provides power to its own circuitry, including its physical layer interfaces. The network power bus should be used only as a back-up and not as a primary source of power. Therefore, the bus may be used only in extraordinary circumstances and will not be taxed by ordinary operation. Third, the power supply unit and the load on the components as well as the network power bus and connectors must be protected from any potential damage, including spikes in the voltage and excessive current draw. Faults in the network power bus should not interrupt a component's operation because the other network lines, such as the network data transmission lines, may still be operational thereby allowing for continued data transmission on the network. Further, the operations of the individual component should be continued without interruption if the network power bus experiences a fault. This protection of the network power bus and the individual components is accomplished by means of an over-voltage protection circuit and a current limiting circuit as well as other circuitry used to shield individual devices from spikes in voltage or current.

Fourth, in accordance with the IEEE 1394 standard, each component should be galvanically isolated. Fifth, the power sourcing modules should provide between 8 and 12 Volts DC (11 Volts nominal) to the network power bus. Sixth, each component should operate from bus voltages from 8 to 15 Volts DC. Through these features, the power design can support an arbitrarily large network and can maintain normal operation in the event of a local power outage, a short circuit or an open circuit caused by the network cable's power wires.

Depending on the sourcing requirements of the network bus, some of the components may act as a source and a load, while others may simply act as a load. The Routing Device 34, designed to be a network management entity, will act as a source and a load. There may be additional components that are designed as network management entities with the capability of sourcing power to the network. This power sourcing capability may be turned on or off under software control, as described subsequently. Other components, such as the Analog-Digital Call Terminating Device 38, may be designed as only a load. The integration of the components will depend on the specific needs of the network, including specific power sourcing requirements.

Figure 6A:
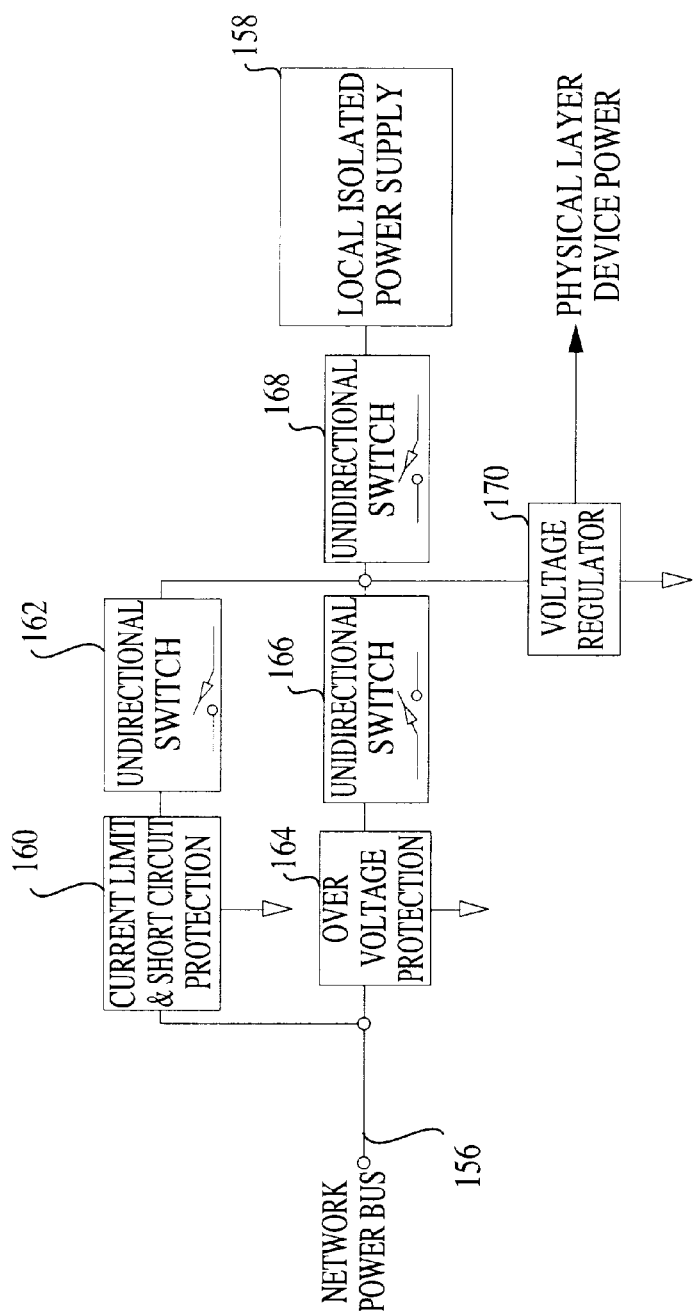
FIG. 6A is a block diagram of power circuitry for a component that may be a power load and a source.
Figure 7A:
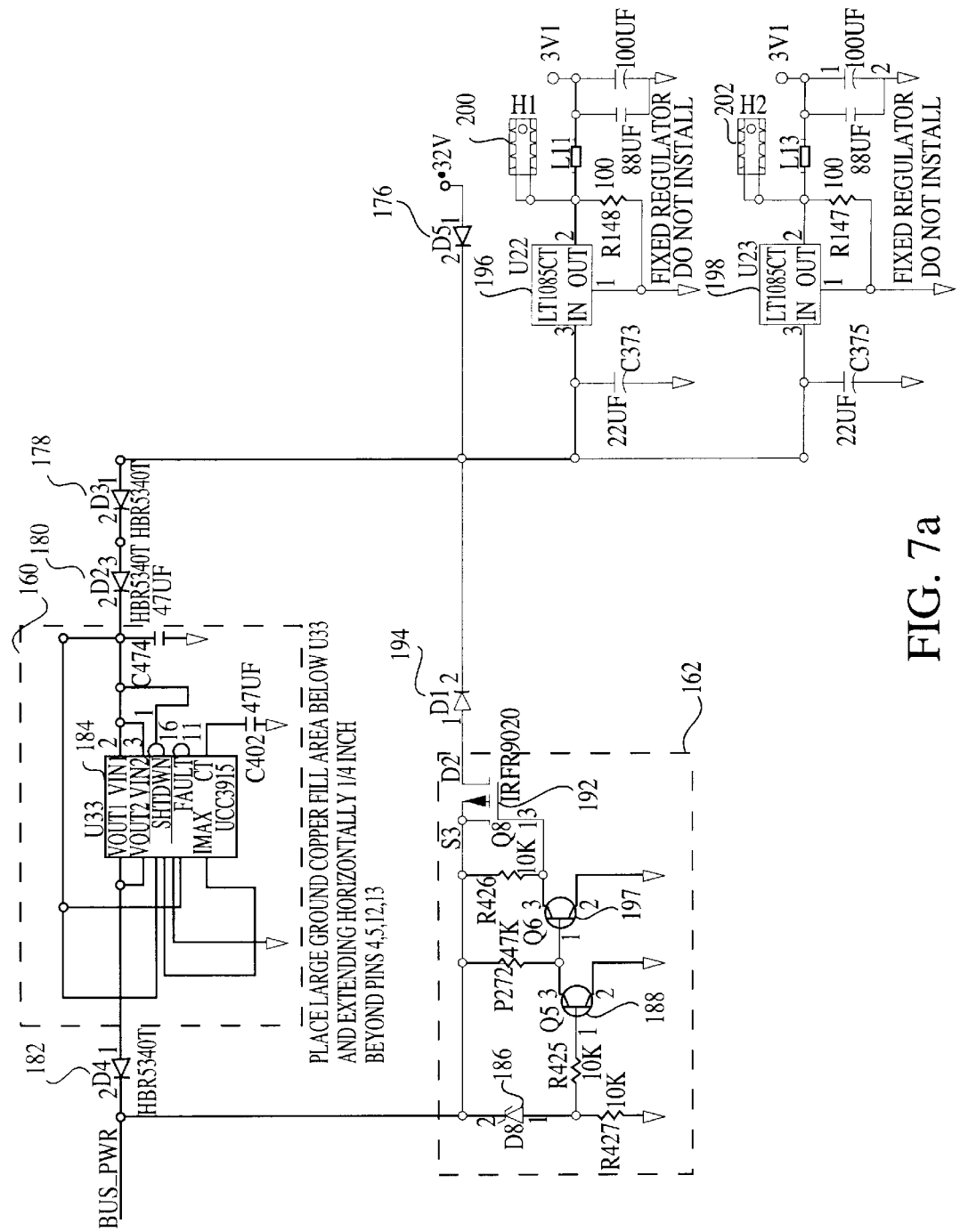
FIG. 7A is a schematic diagram of the power circuitry in FIG. 6A for a component that may be a power load and a source.

FIGS. 6A and 7A are a block diagram and schematic, respectively, of the power circuitry for the network wherein the component acts as a source and a load. The power supply 158 uses a voltage regulator 170, which is described subsequently, to supply power to the physical layer interfaces 152. The voltage regulator 170 and the physical layer interfaces 152 are the load for the power supply unit 158. Simultaneously, and in keeping with the load-share concept, the power supply 158 supplies power to the network power bus 156 via the current limiting branch of the circuits in FIGS. 6A and 7A. Thus, the local isolated power supply 158, in normal operation, supplies power both to the load (physical layer interface) and to the network power bus 156. Further, in order for the physical layer interfaces 152 to be powered primarily by the power supply 158, and only secondarily by the network bus 156, the voltage from the power supply 158 passes through two unidirectional switches 166, 168. Unidirectional switch 162 prevents the network power bus 156 from going through the current limiting circuit 160 and bypassing the over-voltage protection circuit 164 and powering the load directly.

The unidirectional switches are also a means through which the current may be steered in one direction. Unidirectional switches are devices which, when the switch is closed, the switch allows the current to flow in only one direction. A diode is a special instance of a unidirectional switch in that the voltage from the input to the output of the diode serves to switch on the unidirectional switch. Further, the diode only allows current to flow in one direction. Other examples of unidirectional switches include a transistor in combination with a diode or a relay in combination with a diode. In this manner, in the branches of the circuit with the unidirectional switches, the current flows in only one direction.

Figure 7B:
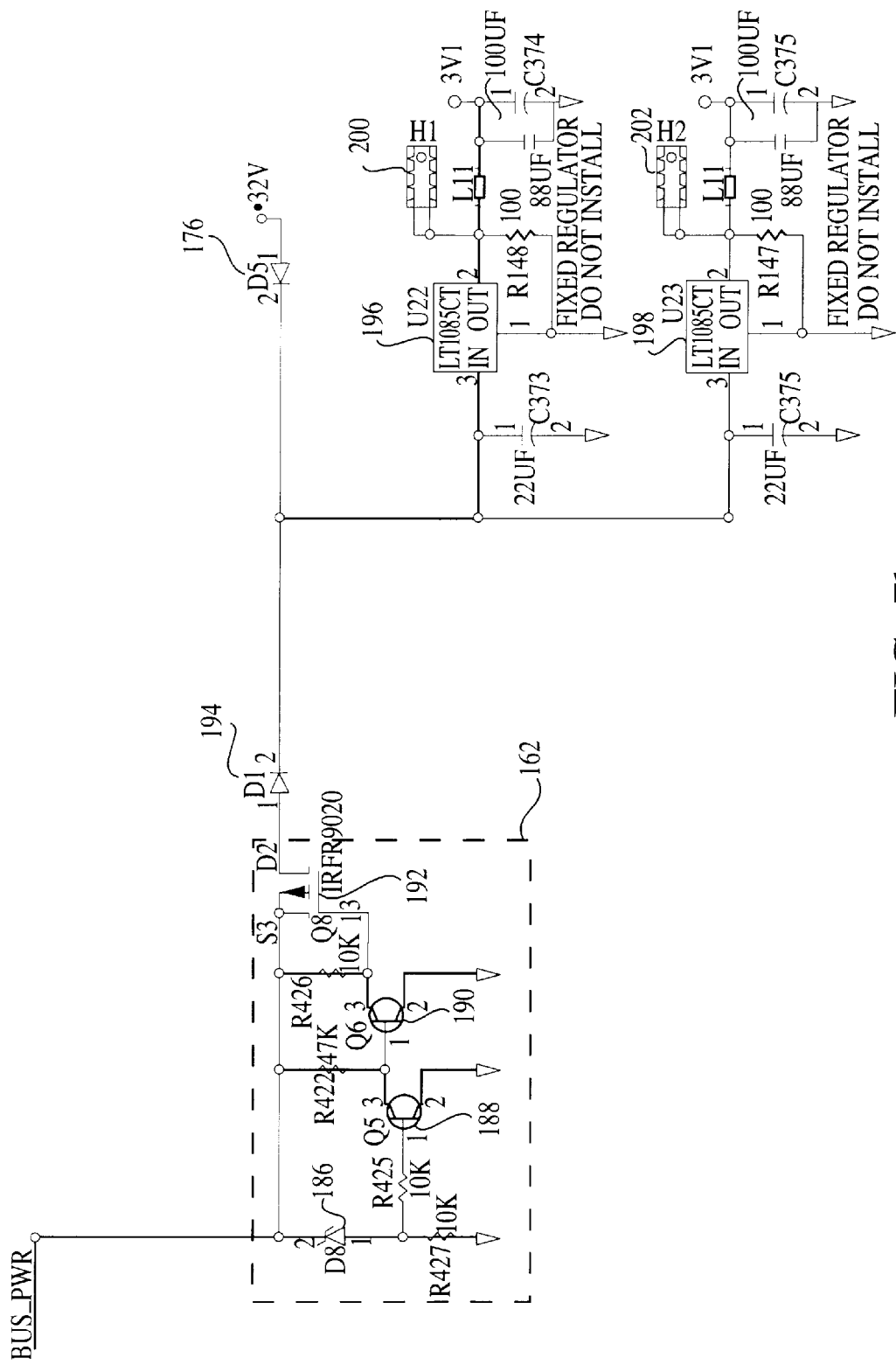
FIG. 7B is a schematic diagram of the power circuitry in FIG. 6B for a component that may be a power load.

In particular, unidirectional switch 166 serves to steer the current from the network power bus 156 to the load and unidirectional switch 168 serves to steer the current from the power supply unit 158 to the load. In one implementation, Schottky diodes, model number HBR5340T, as shown in FIGS. 7A and 7B are used as unidirectional switches in which to steer the current and drop the voltage of the network bus. The three Schottky diodes, D2, D3, D4 (178, 180, 182) are used to steer current to the network bus and to drop the voltage of the supplied power to the nominal network bus value of 11 Volts. Other values of network bus voltage can be chosen by increasing or decreasing the number of diodes used in this branch of the circuit. A fourth Schottky diode D1 (194) steers current from the network bus and further drops the voltage. Therefore, at the junction of the input to the voltage regulator 170, the voltage from the power supply 158 is higher than the voltage from the network power bus 156, thereby ensuring that the power supply voltage will be used by the voltage regulator 170 under normal operation. The voltage may also be lowered from the power supply unit 158 to the network bus by using a transistor network or by a DC to DC converter.

Other means for choosing the power supply voltage to power the load over the network bus voltage 156 includes the following: placing a unidirectional switch 162, or some other means to steer the current in the direction from the power supply to the network power bus 156, between the power supply unit 158 and the network power bus 156; and connecting the power supply unit 158 to the load. An additional means for choosing the power supply voltage to power the load over the network bus voltage includes placing a switch in the path from the bus voltage to the load so that under normal operation, the switch is opened so that the power supply 158 powers the load; the switch is closed when the bus voltage powers the load. While the voltage supplied to the network power bus 156 is DC in the preferred embodiment, AC voltage may be supplied as well.

In this configuration, the load has two independent pathways for power, one from the power supply unit 158 and the second from the network power bus 156. In this manner, if the power supply unit 158 is removed, there is an instantaneous switchover by the network power bus 156 to power the load. Instances in which power from the power supply unit 158 may be removed are due to a failure in the power supply unit 158 or a removal of the power supply unit 158, such as unplugging the power from the power supply unit 158. Further, when power is restored to the power supply unit 158, there is a second instantaneous switchover by the from the network power bus 156 to power supply unit 158 to power the load again. Thus, the load does not lose power at any moment and any operation by the load is continued uninterrupted.

As little as one or as many as all of the components may be designed as a source-load power system. In this manner, when the power supply unit 158 of a single component fails, the voltage regulator 40 still receives voltage via the network power bus 156 (which receives power from the other source-load components) and therefore may still send power to the physical layer interfaces 152.

Figure 6B:
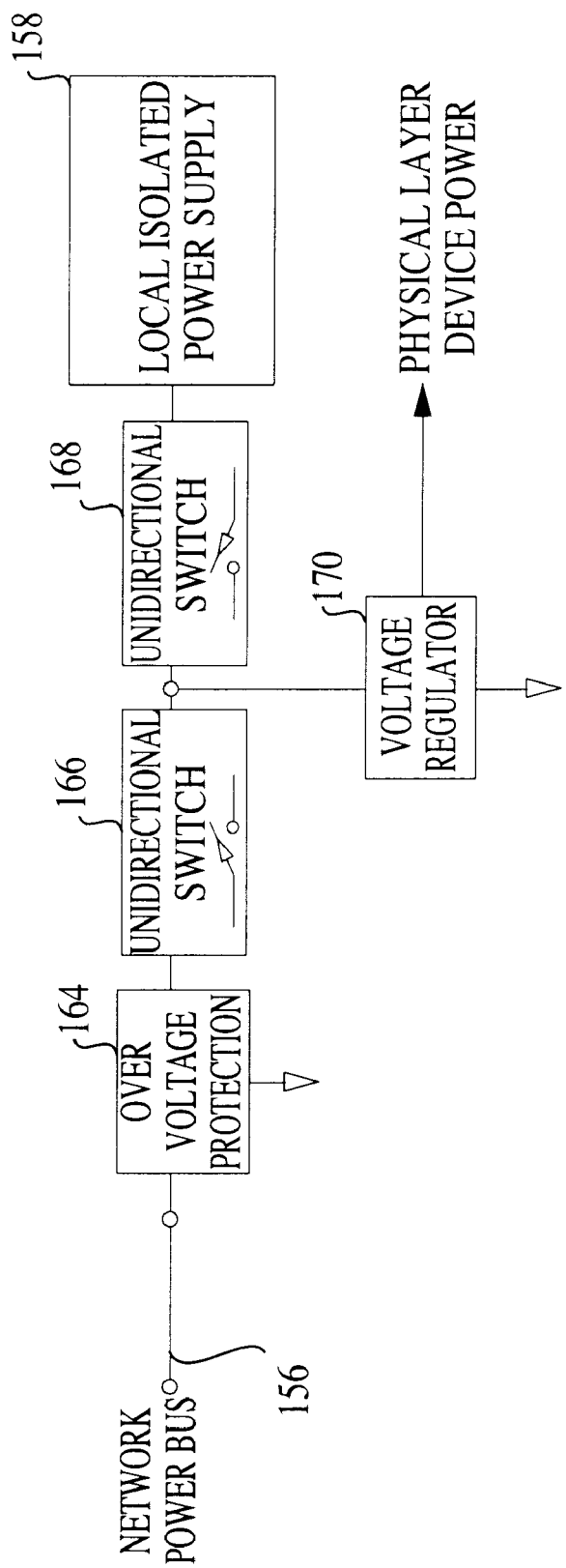
FIG. 6B is a block diagram of power circuitry for a component that may be a power load.

FIGS. 6B and 7B are a block diagram and schematic, respectively, of the power circuitry for the network wherein the component acts only as a load in the event of a power failure. These figures do not have the branch of the component power subsystem which supplies power to the network bus 156. As for the source-load components, the load components may draw power from the network power bus 156 in the event that the component power supply fails. In this way, the operation of the component may be maintained in the face of a localized power failure.

In order to ensure integrity of the power system, the component power supplies 158 are protected from any spikes in the voltage or current. This protection is achieved in two separate respects. First, a blocking diode, D5 (176) as shown in FIGS. 7A and 7B, is placed at the output of the power supply 158. The diode D5 (176) thus acts to block the power supply unit 158 from sinking current to it.

Second, the over-voltage protection circuit 164 acts as an additional layer of protection. The voltage protection circuit 164 protects the power supply as well as the voltage regulator 40 and the electronic circuit breaker located in the current limiting circuit 30. There are several ways to protect other circuit components from a spike in the voltage. As shown in FIGS. 7A and 7B, a means of opening the network power bus voltage input path is provided by a discrete component subcircuit. A P-channel MOSFET (Metal Oxide Semiconductor Field Effect Transistor) device Q8 (192), model number IRFR9020, controlled by the voltage sensing circuit, is connected in series with the bus voltage input path. The voltage sensing circuit is composed of a Zener diode D8 (186), three 10 K$\Omega$ resistors (R425, R426, R427), a 47 K$\Omega$ resistor (R272) and two NPN bipolar junction transistors (BJT) Q5, Q6 (188, 190) that switch off the P-channel MOSFET when the bus voltage exceeds the breakdown voltage of the Zener. When the bus voltage is less than $V_{threshold}$ of the P-channel MOSFET Q8 (192), which is 3–4 Volts, the P-channel MOSFET Q8 (192) does not have a channel formed and is therefore switched off. When the bus voltage exceeds the gate-to-source threshold and is less than the Zener breakdown voltage, which in the preferred embodiment is 15 Volts, the P-channel MOSFET switch is closed (i.e. on). The NPN BJT Q5 (188) in line with the Zener diode is off, since the Zener diode acts as an open circuit. The other NPN BJT Q6 (190) is turned on so that the gate to source voltage of the MOSFET is above the threshold voltage. When the bus exceeds the Zener breakdown voltage, the NPN BJT Q5 (188) in line with the Zener diode D8 (186) turns on and thereby draws current from the base of the second BJT Q6 (190). The base voltage of the second BJT Q6 (190), in turn, becomes very low, turning off the P-channel MOSFET Q8 (192). This "break over" point can be adjusted by simply choosing a Zener diode with an appropriate breakdown voltage. An alternative means of opening the network power bus voltage input path is by using an electromechanical device such as a relay.

In an alternative embodiment, the over-voltage protection circuit protects other components from excessive voltage by shunting the voltage to ground. This is accomplished by placing a Zener diode in series with a resistor to ground. When the network power bus voltage exceeds the breakdown voltage of the Zener diode, the path of the network power bus voltage is shunted through the resistor to ground. However, the Zener clamp diode draws a significant amount of current and may violate the 1.5 Amp maximum set by the IEEE 1394.

Advantages of the design in FIGS. 7A and 7B include lower power dissipation for the MOSFET and control of the "break over" point. The maximum steady state power dissipation for the MOSFET is based on the current flow through the device squared multiplied by the "on" resistance of the MOSFET. The maximum current through the over-voltage circuit is 0.7 Amp for four physical layer interfaces and the resistance of the MOSFET is 0.15 Ohms, creating a maximum steady state power of 73.5 mWatts. Further, the power dissipation during switching is less than 200 mWatts. The embodiment disclosed in FIGS. 7A and 7B therefore allows for lower power dissipation in the event that the bus voltage exceeds the Zener breakdown voltage.

The Unidirectional Switches 162, 166 in the current limiting branch and over-voltage branch of the circuit serve to steer the current in one direction. Further, the Unidirectional Switches 162, 166 serve to protect the electronic circuit breaker by Unitrode Corporation model number UCC3915 (U33, 184). The electronic circuit breaker provides programmable current limits and allowable fault timing. The device inputs are at pins 2 and 3 and the outputs are at pins 14 and 15. Pins 4, 5, 12, and 13 are grounded. The device has a 4-input digital to analog converter (on pins 6–9) that sets the current limit from 0 to 3 Amps in 0.25 Amp increments. The printed circuit board is laid out with pull up and pull down resistor sites on each control pin for maximum flexibility. The initial setting will be for a 1.5 Amp fault level. When the current flow through the device exceeds the fault level, a timing capacitor begins to charge. The UCC3915 will limit the current flow to 1 Amp above the fault level. If the threshold voltage is reached on the timing capacitor, the output of the device is "opened" (Power FET) ceasing all current flow. The device remains in this state for a period of time equal to 50 times greater than the time required to charge the timing capacitor. At this time, the output FET is closed and if the fault condition is still present, the timing capacitor begins to charge again resulting in a 2% duty cycle operation until the fault condition is removed. The fault time is set by the capacitor (0.47 $\mu$F) connected to the CT pin (pin 11). The fault time for the 0.47 $\mu$F timing capacitor is 1.316 mSec. A delay in the output current after initial power up is also provided with the UCC3915. The delay is set by the charging of another capacitor connected to pin SHUTDWN! (pin 1). While there is momentary current above the 1.5 Amp limit as dictated by the IEEE 1394, the average amount of time during a fault condition of current over the 1.5 Amp limit is 2%, as described above.

Further, the UCC3915 has an input (SHUTDWN!) which switches the device on and off thereby allowing or disallowing the power supply unit to supply power to the bus. In order to shutdown the UCC3915 device, the SHUTDWN! pin must be driven low. In order to do this, a transistor may be placed in parallel with any other components connected to the SHUTDWN! pin. In this manner, when the transistor is turned on, via a control signal, the pin is brought low, thereby shutting off the UCC3915. Using this feature on the UCC3915, the power sourcing capability of the component may be switched on or off in software. Depending on the sourcing requirements for the network power bus, certain components connected to the bus may act as both a source and a load whereas other components may act as a load based on input to the UCC3915.

The FAULT pin on the UCC3915 indicates that a fault has occurred with the UCC3915. Faults which are reported by the FAULT pin include a short circuit, an excessive current draw, an excessive thermal reading, or a loss of power on the UCC3915.

The maximum input voltage for the UCC3915 is 15 Volts, thereby driving the 15V limitation on the network power bus. If a similar part to the UCC3915 may allow a voltage up to 40 Volts, the entire voltage swing to 40V may be used as dictated by the IEEE 1394 standards. For typical values for supply current for the physical layer interface devices 22, up to twelve physical layer interface loads can be driven through one UCC3915 set at 1.5 Amps. This is enough to supply power to three 6-port modules, the arrangement which is disclosed in FIG. 5, in the event of local power failure in one of those modules. Or, this is enough to supply power to twelve 3-port modules, or one 6-port and eight 3-port modules.

In an alternative embodiment, the current limiting circuit 160 may be implemented using a passive device such as a positive temperature coefficient thermistor. The high current heats up the thermistor and eventually cuts off the current. Further, other means by which to limit the current may be used. However, for reasons of response time as well as other features including switching capabilities, the UCC3915 is used.

Figure 8:
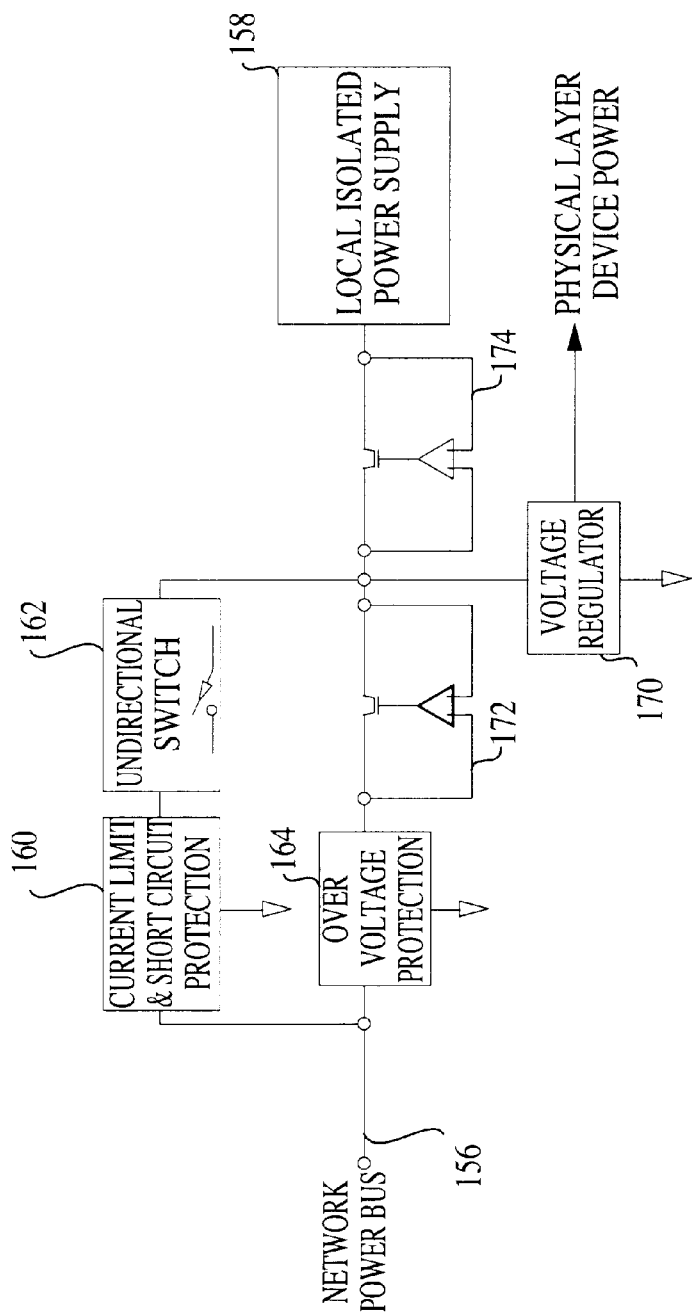
FIG. 8 is a block diagram of an alternative embodiment of the power circuitry for a component that may be a power load and a source.

Referring to FIG. 8, an alternative embodiment for the Unidirectional Switches is shown. The Unidirectional Switches are replaced by a comparator connected to a pass transistor 172, 174. If the voltage input at the positive node is greater than the voltage at the negative node of the comparator, the comparator activates the pass transistor. In this manner, the comparator transistor pair 172, 174 acts to steer the current and drop the voltage.

Figure 9:
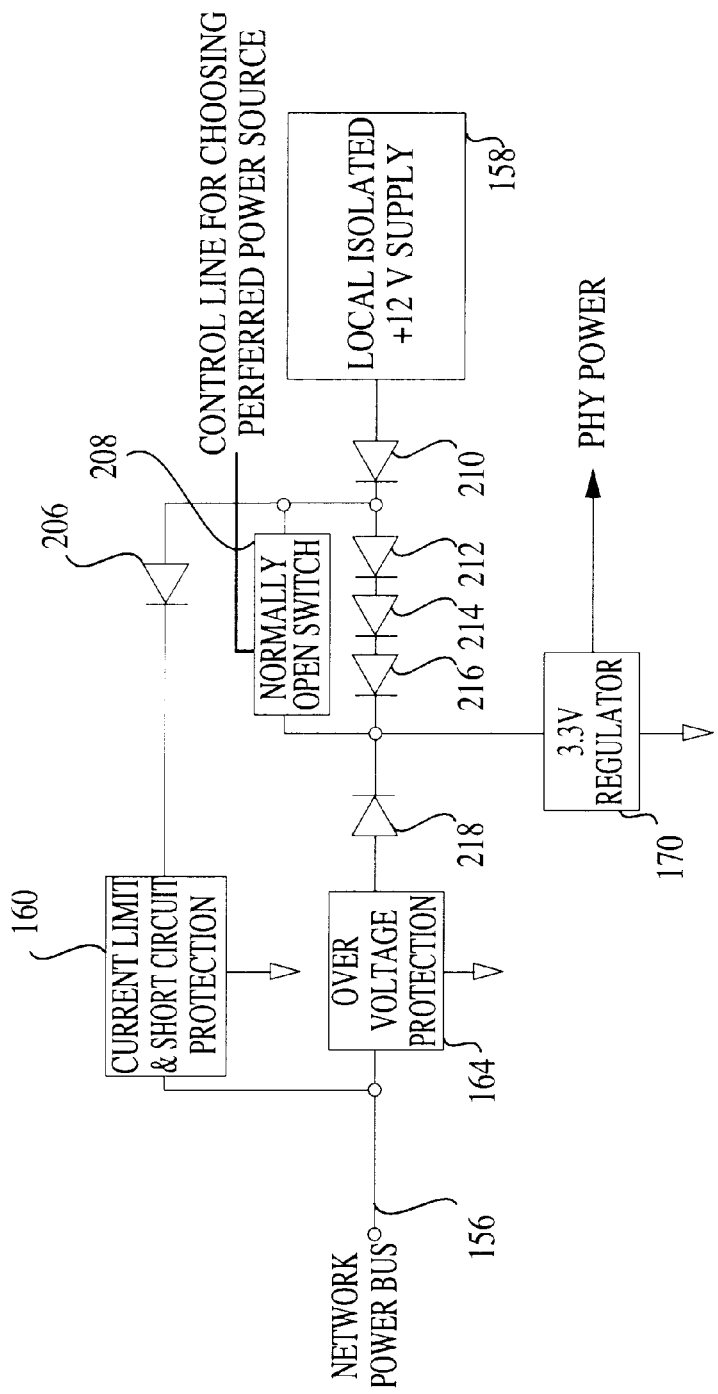
FIG. 9 is a block diagram of the power circuitry for a component that sources power to the network bus and to the load and wherein the network bus preferentially powers the load.

Referring to FIG. 9, an alternative embodiment of the source-load configuration is shown. Rather than powering the load primarily from the power supply unit 158 and secondarily from the network power bus 156, the network power bus 156 is the source of power for the load with the power supply unit 158 as a backup power supply. Diodes 206, 210, 212, 214, 216 and 218 act as unidirectional switches whereby the current is steered in one direction. Controllable voltage drops via diodes 212, 214, and 216 control whether the network power bus 156 or the power supply unit 158 powers the load. As shown in FIG. 9, under normal operation, the switch 208 across diodes 212, 214, and 216 is normally open so that the voltage drops across three diodes. In this manner, the voltage at the output of Diode 218 is higher than the output of Diode 216 so that the network power bus 156 powers the load. Using a control line to close switch 208 thereby bypasses diodes 212, 214, and 216, eliminating the voltage drop across those diodes. Thus, the voltage at the output of diode 210 is higher than the output at diode 218 so that the local isolated power supply 158 powers the load. When the controller of the power subsystem wishes to transfer the source of power from the network power bus 156 to the power supply unit 158, the controller sends a signal to close the switch 208. Further, when switch 208 is open and the network power bus 156 fails, the power supply unit 158 instantaneously powers the load.

Likewise, FIG. 9 may be configured so that the switch 208 is normally closed (so that the power supply unit 158 normally powers the load) and switch 208 is opened when the network power bus 156 is to power the load. Moreover, when switch 208 is closed and the power supply unit 158 fails, the network power bus 156 instantaneously powers the load.

Combining the embodiments of FIGS. 6–9 allow for a mixture of methods of powering the load. Some component loads may be powered primarily by the local power supply unit whereas other component loads may be powered primarily by the network power bus. Depending on the power needs of the system, the network can be configured as a combination of both embodiments.

One of the requirements of the IEEE 1394 is the maintenance of galvanic isolation. To accomplish this, the Routing Device 34 and other power sourcing components support full DC isolation of the physical layer interface subsystem power in accordance with the IEEE 1394 specifications. Physical layer interface power is obtained from an independent isolated power supply unit 158 on the Routing Device 34 which is regulated down onboard to 3.3 Volts. This power supply unit output and associated circuitry have both power and common isolated from any internal power and ground. Therefore, a DC isolation barrier exists between the physical layer interface and link layer controller.

Because of electromagnetic compatibility concerns with the many high speed systems within each module, a linear, rather than a switching regulator is used to obtain the 3.3 Volts for the physical layer interface power. Each of the circuits disclosed is compatible with either a linear or a switching voltage regulator; however, linear regulators are used rather than switching regulators. Switching regulators are more efficient at higher voltages but produce significant high frequency noise which may interfere with the physical layer interface device 152. Therefore, a linear regulator from Linear Technology, model number LT1085 CT is used. The LT1085 CT is a three input device with the input voltage at pin 3, the output regulated voltage of 3.3 volts at pin 2 and the ground at pin 1. A 22 $\mu$F capacitor is connected to pin 3 of the linear regulators 196, 198. A 100$\Omega$ resistor is placed between pins 2 and 3 of the linear regulators 196, 198. The associated thermal dissipation problems due to the linear regulator are accommodated using heat sinks 200, 202, as shown in FIGS. 7A and 7B as heat sinks H3910. Two heat sinks are used to dissipate the power of the linear regulators lessening the requirements of the heat sink to 16.5° C./W, as shown in FIGS. 7A and 7B. Finally, the output of the linear regulators are filtered via capacitors and inductors for a more stable voltage output.

Because of the use of linear regulators 170, the constraints on externally supplied network power become 8–15 Volts, rather than the 8–40 Volts specified in the IEEE 1394 specification. This departure from the IEEE 1394 specification is allowable due to the closed nature of the network. In the event that the network bus voltage exceeds 15 Volts, which may happen if an incompatible device were hooked onto the network, the components connected to the network, including the physical layer interfaces 152, would be protected. Over-voltage protection circuitry, described above, cause the physical layer interface 152 to be isolated from external network power in the event of a voltage surge.

From the foregoing detailed description, it will be appreciated that numerous changes and modifications can be made to the aspects of the invention without departure from the true spirit and scope of the invention. This true spirit and scope of the invention is defined by the appended claims, to be interpreted in light of the foregoing specification.

We claim:

1. A data processing system comprising in combination:
a single network bus containing data transmission lines and a network power line, the network bus complying with a network standard, the network standard having a maximum allowable current and a maximum allowable voltage in the network power line;
a first power supply unit connected to the network power line;
a first network load connected to the first power supply and the network power line;
a second network load connected to the network power line;
a second power supply unit connected to the second network load, the second power supply unit supplying voltage to the second network load which is higher than voltage supplied by the network power line;
means for selecting whether the first power supply or the network power line powers the first network load;
means for limiting voltage from the power line to the first network load and the second network load to a value less than or equal to the maximum allowable voltage for the network standard;
means for limiting current from the first power supply unit to the network power bus to a value less than or equal to the maximum allowable current for the network standard.

2. A data processing system as claimed in claim 1 wherein the network standard is the IEEE 1394 standard.

3. A data processing system as claimed in claim 1 wherein the means for selecting the power supply unit to power the first network load includes a means for lowering the voltage from the first power supply unit to the network power line.

4. A data processing system as claimed in claim 1 further comprising means for steering the current from the first power supply unit to the network power line.

5. A data processing system as claimed in claim 4 wherein the means for steering the current from the first power supply unit to the network power line includes a diode.

6. A data processing system comprising in combination:
a single network bus containing data transmission lines and a network power line, the network bus complying with a network standard, the network standard having a maximum allowable current and a maximum allowable voltage in the network power line;
a first power supply unit connected to the network power line;
a first network load connected to the first power supply and the network power line;
a second network load connected to the network power line;

a second power supply unit connected to the second network load;

first power selection circuit connected between the first power supply unit and the network power line for selecting the first power supply unit to power the first network load;

second power selection circuit connected between the second power supply unit and the network power line for selecting the second power supply unit to power the second network load, and for instantaneously selecting the network power line to power the second network load upon removal of power by the second power supply unit;

voltage limiting circuit, connected between the power line and the first network load and the power line and the second network load, for opening the connection to the network power line when the voltage on the network power line exceeds the maximum allowable voltage for the network standard; and current limiting circuit connected between the first power supply unit and the network power line for opening the connection between the first power supply unit and the network power line when the current on the network power line exceeds the maximum allowable current for the network standard.

7. A data processing system as claimed in claim 6 wherein the network standard is the IEEE 1394 standard.

8. A method of powering components within a data processing system, the data processing system complying with at network standard and having a single network bus containing data transmission lines and a power bus line, a first component with a first power supply unit and a first network load, a second component with a second power supply unit and a second network load, the power bus line connected to the first power supply, the first network load and the second network load, the network standard having a maximum allowable current and a maximum allowable voltage for the network power line, said method comprising the steps of:

supplying power to the power bus line by the first power supply unit;

selecting the first power supply unit, rather than the power bus line, to power the first network load;

selecting the second power supply unit, rather than the power bus line, to power the second network load;

removing the power supplied to the second network load by the second power supply unit;

powering instantaneously the second network load by the network power line after the power from the second power supply unit to the second network load is removed; and opening the connection between the second network load and the network power line in the event of an increase in the network power line current greater than the maximum allowable current for the network standard.

9. A method as claimed in claim 8 further comprising the step of opening the connection between the first power supply unit and the network power line in the event of an increase in the network power line voltage greater than the maximum allowable voltage for the network standard.

10. A method as claimed in claim 8 further comprising the steps of:

after the step of powering instantaneously the second load by the network power line after the power from the second power supply unit to the second network load is removed, providing power from the second power supply; and powering instantaneously the second network load by the second power supply unit, rather than the power bus line.

11. A method as claimed in claim 8 wherein the network standard is the IEEE 1394 standard.

* * * * *